United States Patent [19]

Ono et al.

[11] 3,723,510

[45] Mar. 27, 1973

[54] PROCESS FOR PRODUCING ACETIC ESTERS OF BUTENEDIOL

[75] Inventors: Isao Ono; Tadahisa Yanagihara; Hiroaki Okada; Takeshi Uotani, all of Shin-Nanyo, Japan

[73] Assignee: Toyo Soda Manufacturing Co., Ltd., Oaza-Tonda, Shin Nanyo-shi, Yamaguchi, Japan

[22] Filed: Dec. 9, 1971

[21] Appl. No.: 206,539

[30] Foreign Application Priority Data

Dec. 14, 1970 Japan..............................45/110550

[52] U.S. Cl. ............................................260/497 R
[51] Int. Cl................................................C07c 67/04
[58] Field of Search...................................260/497 R

[56] References Cited

FOREIGN PATENTS OR APPLICATIONS 4,531,926   10/1970   Japan................................260/497 R

*Primary Examiner*—Henry R. Jiles
*Assistant Examiner*—Richard D. Kelly
*Attorney*—Norman F. Oblon et al.

[57] ABSTRACT

Acetic esters of butenediol are prepared by the reaction of butadiene, an oxygen containing gas and acetic acid in the presence of a catalytic amount of a catalyst system of at least one member being cupric bromide (II) and/or cupric acetate (II), and at least one member being an alkali or alkaline earth metal salt acetate and/or bromide.

8 Claims, No Drawings

PROCESS FOR PRODUCING ACETIC ESTERS OF BUTENEDIOL

BACKGROUND OF THE INVENTION

1. Field of the Invention

This invention relates to a one-stage process for producing acetic esters of butenediol from butadiene.

2. Description of Prior Art

The acetic esters of butenediol, such as 2-butene-1,4-dioldiacetate (also known as 1,4-diacetoxy-2-butene), 3-butene-1,2-diol diacetate (also known as 3,4-diacetoxy-1-butene) and 3-butene-1,2-diol monoacetate, are useful for many diverse applications including the synthesis of butenediol and tetrahydrofuran, etc.

It has been disclosed that butenediol diacetate can be prepared in a one-step process by the reaction of butadiene and acetic acid in the presence of cupric chloride (II)-sodium acetate (Japanese Patent Publication No. 31926/1970).

This process, as well as all of the other conventional techniques for producing butenediol diacetate, have suffered the disadvantages that:

1. They were based on a quantitative reaction and not on a catalytic reaction;
2. their reaction rate and yields were quite low, and
3. the separation of the reaction product was difficult due to the small weight ratio between the reaction product and the catalyst.

A need exists, therefore, for a process of producing butenediol diacetate by a catalytic reaction wherein the rate of reaction and product yields are high and wherein the reaction product can be easily separated from the reaction mixture, which would thereby be quite industrially attractive.

SUMMARY OF THE INVENTION

Accordingly, it is one object of this invention to provide a process for producing acetic esters of butenediol by a high yield, high reaction rate catalytic reaction.

This and other objects, as will hereinafter become more readily apparent, has been attained by reacting in a single stage, butadiene, an oxygen containing gas and acetic acid in the presence of a catalytic amount of a catalyst system of cupric bromide (II) and/or cupric acetate (II), and the acetate and/or bromide of an alkali metal and/or an alkaline earth metal, wherein at least one of the components in said catalyst system is the bromide.

DETAILED DESCRIPTION OF THE INVENTION

Although the quantity of cupric bromide (II) and cupric acetate (II) used in the process of this invention is not particularly critical, it is desirable to use 0.02 – 2.0 mol/$l$., and preferably 0.2 – 1.0 mol/$l$. in the reaction liquor. Similarly, although there is no particular criticality in the quantity of alkali metal or alkaline earth metal acetate and/or bromide used, it is desirable to use 0.1 to 10 equivalent weights/equivalent weight of cupric salt, and more preferably 0.5 – 5 equivalent weight/equivalent weight.

Instead of using a metal acetate directly, it is possible to use a compound, such as an hydroxide, which, under the reaction conditions, will form the corresponding acetate.

The oxygen containing gas used herein may be pure oxygen, or oxygen diluted with an inert gas, such as nitrogen, and hence air may be used.

The temperature of the reaction should be maintained within the range of room temperature to 200° C. and preferably 50° to 150° C. with the pressure being at least atmospheric or higher. The particular reaction temperature and pressure will depend upon the particular product desired. For instance, the quantity of monoacetate will tend to be lower and the quantity of diacetate will tend to be higher with an increase in the reaction temperature.

Using the methods of this invention, acetic esters of butenediol can be prepared by a reaction which is characterized by a high reaction rate and a high yield as compared with prior state of the art methods. Moreover, the reaction of this invention is quite industrially attractive, since it is a catalytic reaction.

Having now generally described the invention, a further understanding can be attained by reference to certain specific Examples which are provided herein for purposes of illustration only and should not be construed as limiting unless otherwise so specified.

EXAMPLE 1

200 mls. of glacial acetic acid, 20 g. (0.5 mol/l) of cupric acetate (II), and 42 g. (2.0 mol/l) of lithium bromide were placed in a reaction vessel equipped with a thermometer, a cooler, a gas blowing tube and a stirrer. The temperature was maintained at 110° C. in an oil bath, and a mixed gas of butadiene and oxygen, in a ratio of 1 : 1, was blown into said autoclave at a rate of 12 liters per hour and the reaction was continued for 20 hours, while stirring.

EXAMPLES 2 – 13

The following experiments were carried out using similar equipment and procedures as in Example 1, except that variations in the catalyst and other conditions were made.

The results are shown in Table 1.

COMPARATIVE EXAMPLES 1 – 2

The following experiments were conducted using similar equipment and procedures as in Example 1, but carrying out the reaction using certain well known catalysts. The results are shown in Table I.

EXAMPLE 14

100 mls. of acetic acid, 5.6 g. (0.25 mole/l) of cupric bromide (II), 2.05 g. (0.25 mol/l) of sodium acetate and 10.8 g. of butadiene were placed in an autoclave of 20 cc. capacity, the inside of which was lined with teflon. A mixed gas of oxygen and nitrogen, in a ratio of 1 : 1, was blown into said autoclave under a pressure of up to 20 kg/cm². The reaction was then carried out at 130° C. for 3 hours. Oxygen was replenished by using a secondary pressure accumulator. The results of analysis of the product by gas chromatography showed the formation of 3-butene-1,2-dioldiacetate, 3-butene-1,2-diolmonoacetate and 2-butene-1,4-dioldiacetate in amounts of 4.6 g., 2.0 g., and 8.4 g., respectively.

TABLE I

| | Catalysts (mole/l.) | | Reaction condition | | Products | | | |
|---|---|---|---|---|---|---|---|---|
| Example | Cupric salt | Alkali or Alkaline earth metal salt | Temp. (° C.) | Hour/w. | A* | B* | C* | Total |
| 1 | Cupric acetate 0.5 | Lithium bromide 2.0 | 90 | 20 | 29.4 | 59.0 | 44.0 | 132.4 |
| 2 | do | Sodium bromide 2.0 | 90 | 20 | 21.5 | 57.0 | 14.5 | 93.0 |
| 3 | do | Potassium bromide 2.0 | 90 | 20 | 6.0 | 10.9 | 3.8 | 20.7 |
| 4 | do | Magnesium bromide 1.0 | 90 | 20 | 14.7 | 43.4 | 11.4 | 69.5 |
| 5 | do | Calcium bromide 1.0 | 90 | 20 | 10.9 | 16.8 | 10.0 | 37.7 |
| 6 | do | Barium bromide 1.0 | 90 | 20 | 17.2 | 46.1 | 10.8 | 74.1 |
| 7 | Cupric bromide 0.5 | Lithium acetate 0.5 | 70 | 20 | 7.2 | 44.0 | 10.0 | 61.2 |
| 8 | do | do | 110 | 5 | 6.2 | 2.1 | 11.4 | 19.7 |
| 9 | do | Sodium acetate 0.5 | 90 | 5 | 3.3 | 12.0 | 3.8 | 19.1 |
| 10 | do | do | 110 | 5 | 6.9 | 11.5 | 9.0 | 27.4 |
| 11 | do | Sodium bromide 0.5 | 90 | 20 | 25.0 | 60.2 | 52.0 | 137.2 |
| 12 | Cupric bromide 2.0 | Sodium acetate 2.0 | 100 | 20 | 16.3 | 46.5 | 12.1 | 74.9 |
| 13 | Cupric bromide 0.2 | do | 100 | 20 | 6.0 | 12.1 | 1.5 | 19.6 |
| Comparison | | | | | | | | |
| 1 | Cupric chloride 0.5 | Sodium acetate 0.5 | 90 | 20 | 0.5 | 1.3 | 0.4 | 2.2 |
| 2 | do | do | 110 | 20 | 3.1 | 1.0 | 2.4 | 6.5 |

*A = 3-butene-1,2-dioldiacetate (=3,4-diacetoxy-1-butene); B = 3-butene-1,2-diolmonoacetate; C = 2-butene-1,4 dioldiacetate (=1,4-diacetoxy-2-butene).

Having now fully described the invention, it will be apparent to one of ordinary skill in the art that many changes and modifications can be made thereto without departing from the spirit or scope of the invention. Accordingly,

What is claimed as new and desired to be secured by letters patent is:

1. A process for producing acetic ester of butenediol which comprises reacting butadiene, an oxygen containing gas and acetic acid in the presence of a catalytic amount of a catalyst system consisting essentially of at least one member selected from the group consisting of cupric bromide (II) and cupric acetate (II) and at least one member selected from the group consisting of the acetate and bromide of an alkali metal and an alkaline earth metal, wherein at least one component of said catalyst system is the bromide.

2. The process according to claim 1, wherein the alkali metal is lithium, sodium or potassium.

3. The process according to claim 1, wherein the alkaline earth metal is barium, magnesium or calcium.

4. The process according to claim 1, wherein the quantity of cupric salt is in the range of 0.02 to 2.0 moles per liter of reaction liquor.

5. The process according to claim 1, wherein the quantity of the alkali or alkaline earth metal compound is 0.1 to 10 weight equivalents per weight equivalent of cupric salt.

6. The process according to claim 1, wherein the reaction temperature is from room temperature to 200° C.

7. The process according to claim 1, wherein the pressure is at least atmospheric.

8. The process according to claim 1, wherein the oxygen containing gas is air.

* * * * *